(12) United States Patent
Jurdeczka

(10) Patent No.: US 10,706,523 B2
(45) Date of Patent: Jul. 7, 2020

(54) ASSEMBLY COMPLETENESS INSPECTION METHOD USING ACTIVE RANGING

(71) Applicant: Alstom Transport Technologies, Saint-Ouen (FR)

(72) Inventor: Uwe Jurdeczka, Braunschweig (DE)

(73) Assignee: Alstom Transport Technologies, Saint-Ouen (FR)

( * ) Notice: Subject to any disclaimer, the term of this patent is extended or adjusted under 35 U.S.C. 154(b) by 0 days.

(21) Appl. No.: 15/487,580

(22) Filed: Apr. 14, 2017

(65) Prior Publication Data

US 2017/0309010 A1  Oct. 26, 2017

(30) Foreign Application Priority Data

Apr. 25, 2016 (EP) ..................................... 16305482

(51) Int. Cl.
*G06T 7/00* (2017.01)

(52) U.S. Cl.
CPC .......... *G06T 7/0004* (2013.01); *G06T 7/0008* (2013.01); *G06T 2207/10012* (2013.01); *G06T 2207/10028* (2013.01); *G06T 2207/20016* (2013.01); *G06T 2207/20021* (2013.01); *G06T 2207/30136* (2013.01); *G06T 2207/30164* (2013.01)

(58) Field of Classification Search
None
See application file for complete search history.

(56) References Cited

U.S. PATENT DOCUMENTS

| | | | | |
|---|---|---|---|---|
| 2002/0143506 A1* | 10/2002 | D'Aligny | ............. | G01B 11/002 703/6 |
| 2009/0284755 A1* | 11/2009 | Friemel | .................. | G01B 11/24 356/601 |

(Continued)

FOREIGN PATENT DOCUMENTS

WO   WO-2017072447 A2 *  5/2017  ............. G06F 17/50

OTHER PUBLICATIONS

Boehler W., Bordas, Vicent M., Marbs A., Investigating laser scanner accuracy, roceedings: XIXth CIPA Symposium, Antalya, Sep. 30-Oct. 4, 2003.*

(Continued)

*Primary Examiner* — Jiangeng Sun
(74) *Attorney, Agent, or Firm* — Troutman Sanders LLP

(57) ABSTRACT

A method for completeness inspection of an assembled structure to check whether said structure has all the mounted parts comprising scanning the whole assembled structure with an active ranging scanner, thus obtaining a 3D picture; obtaining a 3D model of the whole structure based on CAD data; subdividing said 3D picture into a number of smaller picture comparison areas and said 3D model into a number of smaller corresponding model comparison areas using a best fit algorithm, thus obtaining a set of final picture comparison areas and corresponding final model comparison areas; for each final model comparison area, identifying desired mounting parts located therein and searching for mounted parts in the corresponding final picture comparison area that match said desired mounting parts; and identifying the desired mounting parts, which have no matching mounted part in the final picture comparison areas, as missing from the assembled structure.

9 Claims, 4 Drawing Sheets

(56) References Cited

U.S. PATENT DOCUMENTS

| | | | | |
|---|---|---|---|---|
| 2010/0135534 A1* | 6/2010 | Weston | ............... | G01B 11/007 |
| | | | | 382/106 |
| 2012/0290243 A1 | 11/2012 | Grigoleit et al. | | |
| 2012/0290259 A1* | 11/2012 | McAfee | ............... | G01B 11/24 |
| | | | | 702/155 |
| 2013/0266225 A1 | 10/2013 | Vinciguerra et al. | | |
| 2018/0172436 A1* | 6/2018 | Isei | ..................... | G01B 11/25 |

OTHER PUBLICATIONS

Hong-Seok Park et al: "Development of an Inspection System for Defect Detection in Pressed Parts Using Laser Scanned Data", Procedia Engineering, Elsevier, Amsterdam, NL, vol. 69, Mar. 25, 2014 (Mar. 25, 2014), pp. 931-936, DOI: 10.1016/J.PROENG.2014.03.072 (Year: 2014).*

European Search Report dated Oct. 27, 2016 issued in corresponding European Patent Application No. 16305482.8.

Research and Development in the Measurement and Testing Technology Division, "Model-based assembly test", http://www.iff.fraunhofer.de/de/geschaeftsbereiche/messtechnik-prueftechnik/montagepruefung-modellbasiert.html.

* cited by examiner

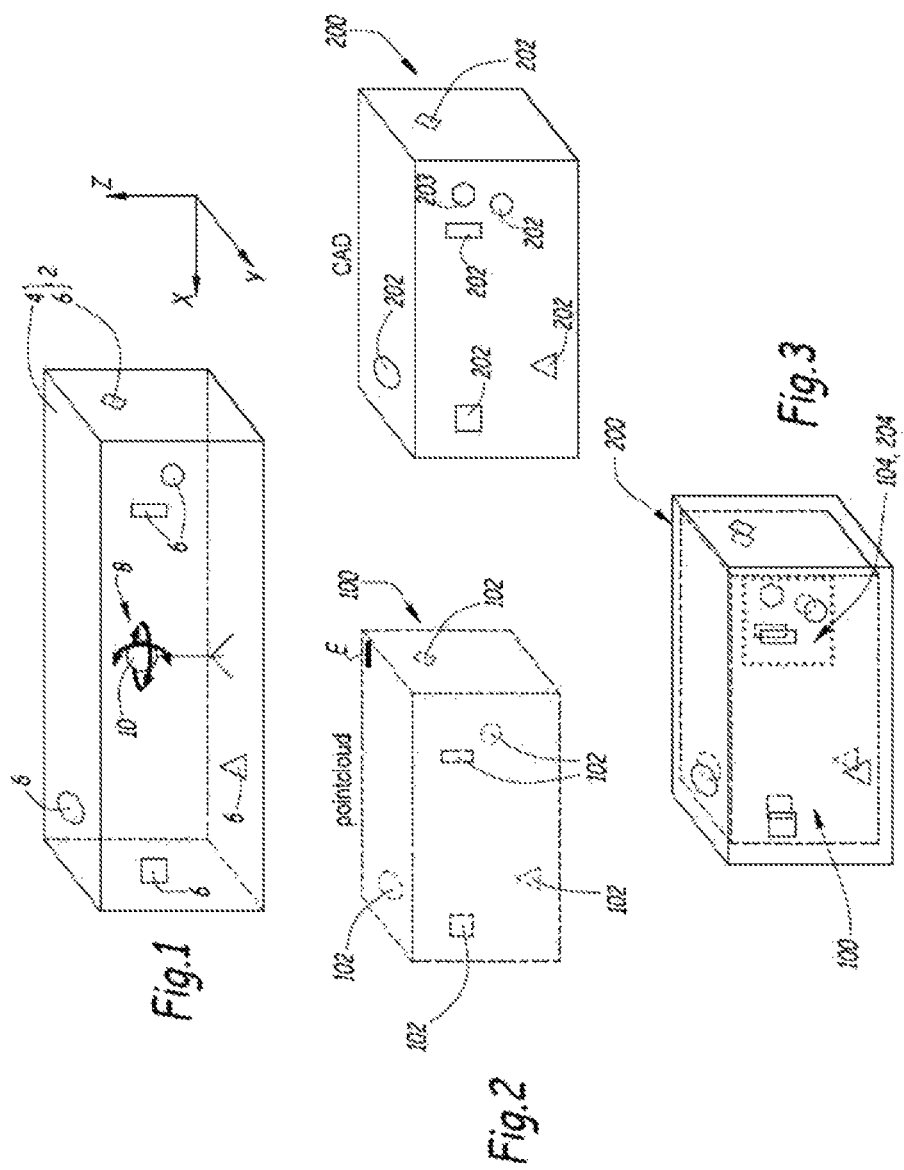

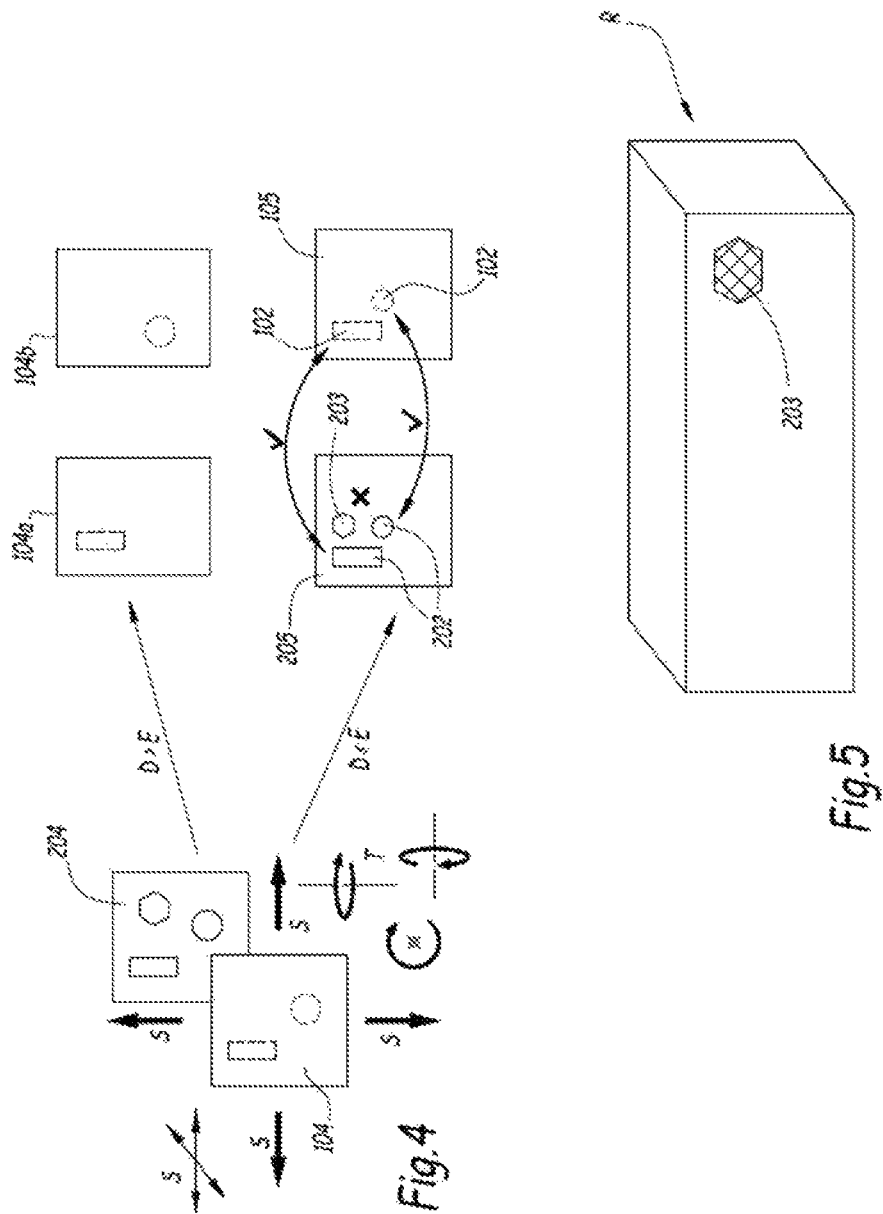

ASSEMBLY COMPLETENESS INSPECTION METHOD USING ACTIVE RANGING

CROSS-REFERENCE TO RELATED APPLICATION

This application is based upon and claims the benefit of priority of the prior European Patent Application No. 16305482.8, filed on Apr. 25, 2016, the entire contents of which are incorporated herein by reference.

FIELD OF TECHNOLOGY

The present invention concerns the field of assembly completeness inspection of large assembled structures such as car bodies of railway vehicles.

BACKGROUND

The article "Flexible modellbasierte Montageprüfung" published by the Fraunhofer-Institut für Fabrikbetrieb und —automatisierung IFF in Magdeburg, downloadable at www.iff.fraunhofer.de/de/geschaeftsbereiche/messtech-nikprueftechnik/montagepruefung-modellbasiert.htl, describes a known assembly completeness inspection method. In this method, a digital camera takes a large quantity of pictures of different sections of a finished assembly. Each recorded picture is then compared to a synthetic picture of how the respective section of the assembly should look like. The synthetic picture is obtained from the CAD-data representing the assembly. Thus, elements of the assembly, which have not been correctly mounted or which are even absent, can be spotted.

Using this known method to inspect large assembled structures, such as car bodies of railway vehicles, is very time consuming. Indeed, in such a case, the digital camera needs to be moved around the whole structure to take a large amount of pictures of small sections of the structure.

Furthermore, this known method involves projecting a strip pattern onto the sections of the structure that are to be pictured. The accurate reflection of the strip pattern is important to obtain a high quality picture. Accordingly, this method is not well adapted to steel structures because such strip patterns are not well reflected by steel.

SUMMARY

An object of the present invention is therefore to provide an assembly completeness inspection method allowing a fast inspection of large assembled structures. The method should also allow accurate inspection of steel structures. On top of that, the method must be able to cope with assembly tolerances.

According to the invention, these objects are achieved with a method for completeness inspection of an assembled structure, said structure comprising a body shell and mounted parts, to check whether said structure has all the mounted parts that it should have, said method comprising the following steps:

a) Scanning the whole assembled structure with an active ranging scanner, thus obtaining a point cloud forming a 3D picture of the whole structure, wherein said active ranging scanner has a given resolution E;

b) Obtaining a 3D model of the whole structure as it should look like in the assembled state based on CAD data modelling the assembled structure, said 3D model including a set of desired mounting parts;

c) Subdividing said 3D picture into a number of ever smaller picture comparison areas and said 3D model into a number of ever smaller corresponding model comparison areas, while, after each subdivision, overlaying each corresponding picture comparison area and model comparison area using a best fit algorithm, said best fit algorithm trying to match salient geometrical features of both areas and then outputting a deviation value D representing the residual deviation in the positions of the matched geometrical features, wherein said subdividing is stopped when the deviation value D is smaller than or equal to the resolution E, thus obtaining a set of final picture comparison areas and corresponding final model comparison areas;

d) For each final model comparison area, identifying desired mounting parts located therein and searching for mounted parts in the corresponding final picture comparison area that match said desired mounting parts; and e) Identifying the desired mounting parts, which have no matching mounted part in the final picture comparison areas, as missing from the assembled structure.

By using an active ranging scanner scanning the whole assembled structure, the inspection process is much quicker. Indeed, an active ranging scanner such as a LIDAR scanner can scan the whole structure with a laser beam from a few different positions. There is no need to move a camera around the structure in order to take numerous pictures. Ranging, such as LIDAR, is also well suited to the inspection of steel surfaces.

By subdividing the 3D picture and the 3D model, one can cancel out potential offsets between the 3D picture and the 3D model that are due to assembly tolerances.

According to preferred embodiments, the inventive method includes one, several or all of the following features, in all technically feasible combinations:
said active ranging scanner is a LIDAR scanner,
said assembled structure is a car body of a railway vehicle,
step a) is carried out at a plurality of different positions within the body shell and results in a plurality of partial scans of the assembled structure, and the 3D picture of the whole structure is obtained by combining said partial scans into a single consolidated scan,
the step between step a) and step b) of editing the 3D picture by:
  removing elements in the 3D picture that represent the assembled structure's surroundings;
  thinning out said point cloud by removing redundant points, thus reducing the storage space needed for the 3D picture; and/or
  converting the point cloud into a 3D mesh model,
in step c), the first subdivision of said 3D picture into picture comparison areas and the first subdivision of said 3D model into model comparison areas are carried out such that each picture comparison area and each model comparison area covers at most one section of an edge of said body shell,
the step between step b) and step c) of coarse fitting the whole 3D picture to the whole 3D model,
the resolution E is smaller than 5 mm and preferably equal to 2 mm.

BRIEF DESCRIPTIONS OF THE DRAWINGS

The invention will now be described in detail with reference to the appended drawings, wherein:

FIG. 1 illustrates the scanning step according to the invention;

FIG. 2 shows the point cloud resulting from the scanning and the corresponding 3D model;

FIG. 3 shows the coarse fitting of the 3D picture and the 3D model;

FIG. 4 shows the fine fitting of comparison areas and the identification of missing mounted parts; and FIG. 5 shows how the mounted parts that have been identified as missing can be highlighted.

DETAILED DESCRIPTION

Figure 6:
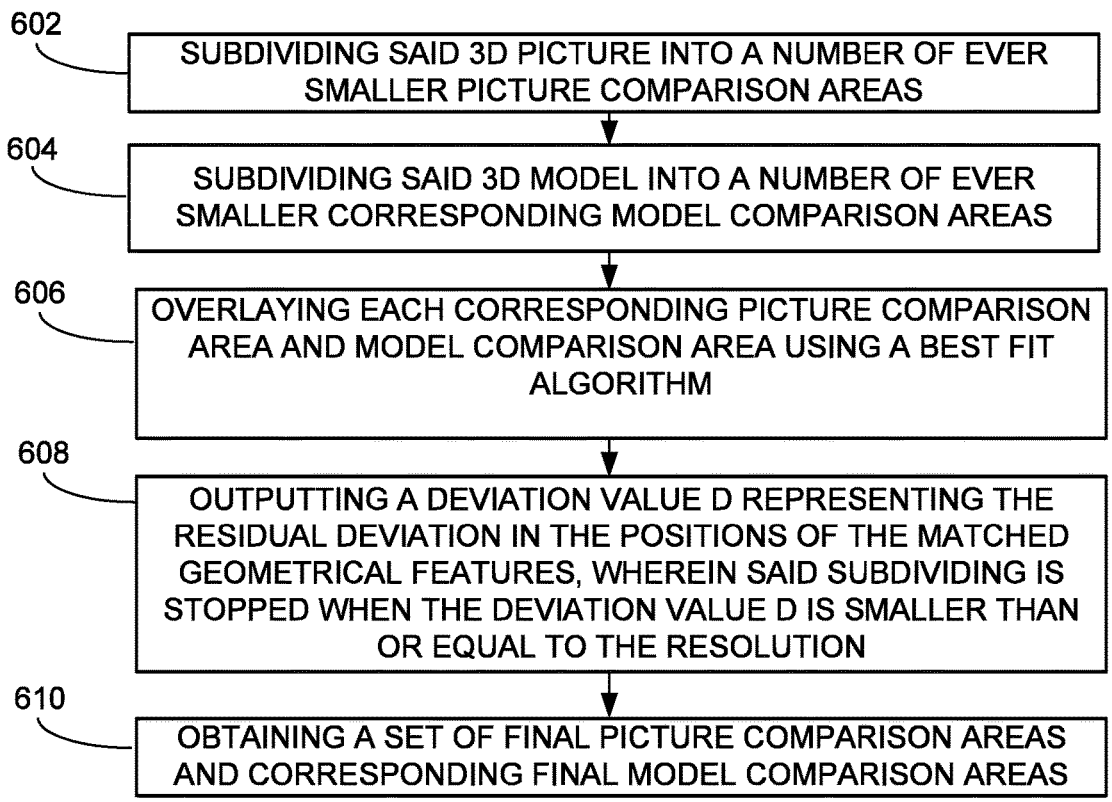
FIG. 6 illustrates a flow process according to the invention.
Figure 7:
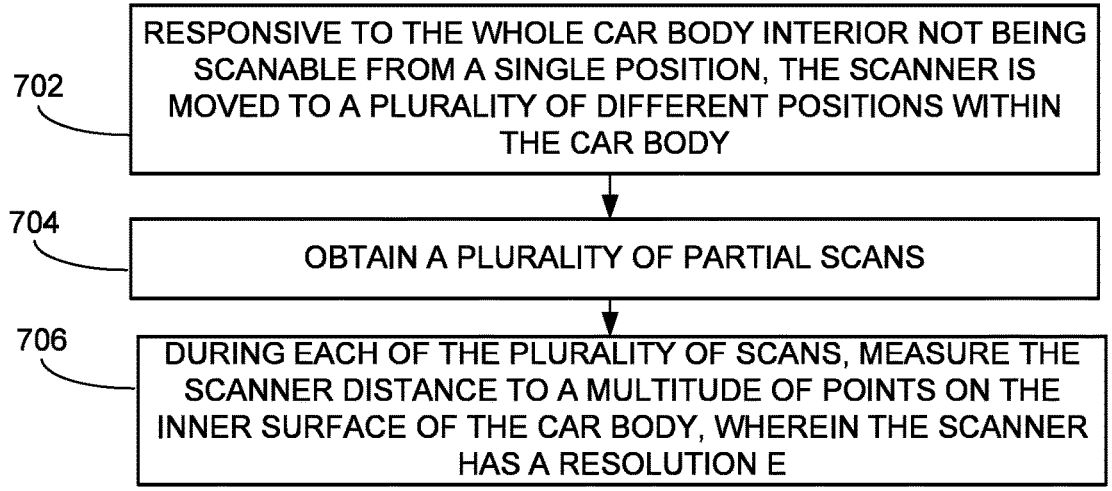
FIG. 7 illustrates another flow process according to the invention.

To assemble a large structure such as the car body of a railway vehicle, a lot of mounting parts must be mounted at the correct position to the car body shell. Typically, the number of mounting parts is in the order of 300. Due to the large number of mounting parts, errors can occur during the assembly process, meaning that some mounting parts are misplaced or even absent from the assembled car body.

It is therefore important to inspect the assembled car body to make sure that it is complete, i.e. that all desired mounting parts are present.

The present invention pertains to a method, which allows a quick, automated and reliable completeness inspection of such a large assembled structure. This method will now be described in detail.

With reference to FIG. 1, there is shown an assembled car body 2 of a railway vehicle. This car body 2 includes a car body shell 4 and mounted parts 6. The car body shell 4 is the basic support structure of the car body 2 and has a generally parallelepipedic shape. The mounted parts 6 vary in size from several square metres to several square centimetres. A mounted part 6 may for example be a lug, a bracket or a rib. The mounted parts 6 are all arranged on the inside of the car body.

According to the invention, the whole car body 2 is scanned with an active ranging scanner 8. Preferably, the active ranging scanner is a light detection and ranging scanner (LIDAR) such as a terrestrial laser scanner. The scanner 8 can scan its complete surroundings by rotating a scanner head 10 around a vertical axis and a horizontal axis as indicated by the arrows.

The scanner 8 is positioned in the interior of the car body 4 and scans the whole interior of the car body. If the whole car body interior cannot be scanned from a single position, the scanner 8 is moved to a plurality of different positions within the car body 4 to obtain a plurality of partial scans. During the scan, the scanner 8 measures its distance to a multitude of points on the inner surface of the car body. The scanner 8 has a resolution E (cf. FIG. 2), which is the distance between two measurement points on the scanned surface. Advantageously, the resolution E is smaller than 5 mm and preferably equal to 2 mm.

The result of the scan is a point cloud 100 as shown in FIG. 2, which forms a three-dimensional or 3D picture of the whole car body. If the car body interior was scanned from several positions, the corresponding partial scans are combined into a single consolidated point cloud 100. The point cloud 100 includes point sets 102, which represent the mounted parts 6 of the car body 2.

Optionally, the obtained 3D picture may be edited by removing elements in the 3D picture that represent the assembled structure's surroundings, thinning out said point cloud by removing redundant points, thus reducing the storage space needed for the 3D picture, and/or converting the point cloud into a 3D mesh model.

The inventive method also involves the generation of a 3D model 200 of how the interior of the assembled car body should look like. This synthetic 3D model 200 is obtained from CAD (Computer Aided Design) data modelling the assembled car body. The 3D model 200 includes geometric shapes 202, 203 representing desired mounting parts that should be present in the car body 2.

FIG. 3 shows the next step of coarse fitting the whole 3D picture 100 to the whole 3D model 200. This means that the whole point cloud 100 is moved relative to the whole 3D model 200 until its shape matches as much as possible the shape of the 3D model 200.

Due to assembly tolerances, the dimensions of the 3D picture and the positions of the point sets 102 therein will generally not exactly match the dimensions of the 3D model 200 and the positions of corresponding geometric shapes 202. For example, the length of the assembled car body 2 might differ by up to 14 mm from the length of the 3D model, leading to a corresponding offset between the 3D picture and the 3D model. Likewise, the positions of the mounted parts 6 often deviate somewhat from the ideal positions in the 3D model. Hence, one cannot directly compare the whole 3D picture with the whole 3D model to identify potentially missing mounting parts.

According to the invention, in order to get around this offset problem, the 3D picture is subdivided into a plurality of picture comparison areas and the 3D model is sub-divided into a plurality of corresponding model comparison areas. The square shaped area in FIG. 3 identified by the crosses represents one such picture comparison area 104 on top of a corresponding model comparison area 204.

More precisely, the first subdivision of said 3D picture into picture comparison areas 104 and the first subdivision of said 3D model into model comparison areas 204 are carried out such that each picture comparison area and each model comparison area covers at most one section of an edge of said body shell 4.

Corresponding picture comparison areas 104 and model comparison areas 204 are then overlaid using a best fit algorithm, cf. FIG. 4. Said best fit algorithm tries to match salient geometrical features of both areas by shifting and rotating as illustrated by the arrows S and T. The best fit algorithm then outputs a deviation value D representing the residual deviation in the positions of the matched geometrical features.

If the deviation value D is smaller than or equal to the resolution E, then the comparison areas 104, 204 are small enough to cancel out potential tolerances.

If the deviation value D is larger than the resolution E, then the comparison areas are further subdivided, cf. FIG. 4, which shows the further subdivision of picture comparison area 104 into two parts 104a, 104b.

Subdividing and subsequent best fitting is carried on until the condition D E is met, thus obtaining a set of final picture comparison areas 105 and corresponding final model comparison areas 205, cf. FIG. 4.

Then, for each final model comparison area 205, one identifies desired mounting parts 202, 203 located therein and searches for point sets 102 (i.e. mounted parts) in the corresponding final picture comparison area 105 that match said desired mounting parts, cf. FIG. 4. As can be seen in FIG. 4, the desired mounting part 203 (the hexagon) has no equivalent in the final comparison area 105. Hence, the desired mounting part 203 is identified as missing.

As shown in FIG. 5, the missing desired mounting parts 203 can be highlighted in a visual representation R of the car body 2. Using this representation R, an operator can then visually inspect the car body 2 to check whether the highlighted mounting parts are indeed missing and take corrective action.

The invention claimed is:

1. A method for completeness inspection of an assembled structure, said structure comprising a body shell and mounted parts, to check whether said structure has all the mounted parts that the said structure should have, said method comprising the following steps of:

scanning the whole assembled structure with an active ranging scanner, thus obtaining a point cloud forming a 3D picture of the whole structure;

obtaining a 3D model of the whole structure as it should look like in the assembled state based on CAD data modelling the assembled structure, said 3D model including a set of desired mounting parts;

subdividing said 3D picture into a number of ever smaller picture comparison areas and said 3D model into a number of ever smaller corresponding model comparison areas, while, after each subdivision, overlaying each corresponding picture comparison area and model comparison area using a best fit algorithm, said best fit algorithm trying to match salient geometrical features of both areas and then outputting a deviation value D representing the residual deviation in the positions of the matched geometrical features, wherein said subdividing is stopped when the deviation value D is smaller than or equal to a distance between adjacent measurement points on the scanned surface, thus obtaining a set of final picture comparison areas and corresponding final model comparison areas;

for each final model comparison area, identifying desired mounting parts located therein and searching for mounted parts in the corresponding final picture comparison area that match said desired mounting parts; and identifying the desired mounting parts, which have no matching mounted part in the final picture comparison areas, as missing from the assembled structure.

2. The method of claim 1, wherein said active ranging scanner is a LIDAR scanner.

3. The method of claim 1, wherein said assembled structure is a car body of a railway vehicle.

4. The method of claim 1, wherein the scanning step is carried out at a plurality of different positions within the body shell and results in a plurality of partial scans of the assembled structure, and wherein the 3D picture of the whole structure is obtained by combining said partial scans into a single consolidated scan.

5. The method of claim 1, further comprising the step between the scanning step and the obtaining step of editing the 3D picture by:

removing elements in the 3D picture that represent the assembled structure's surroundings;

thinning out said point cloud by removing redundant points, thus reducing the storage space needed for the 3D picture; and/or converting the point cloud into a 3D mesh model.

6. The method of claim 1, wherein, in the subdividing step, the first subdivision of said 3D picture into picture comparison areas and the first subdivision of said 3D model into model comparison areas are carried out such that each picture comparison area and each model comparison area covers at most one section of an edge of said body shell.

7. The method of claim 1, further comprising the step between the obtaining step and the subdividing step of coarse fitting the whole 3D picture to the whole 3D model.

8. The method of claim 1, wherein the distance between adjacent measurement points on the scanned surface is smaller than 5 mm.

9. The method of claim 1, wherein the distance between adjacent measurement points on the scanned surface is equal to 2 mm.

* * * * *